United States Patent [19]
Eyal et al.

[11] Patent Number: 6,001,255
[45] Date of Patent: Dec. 14, 1999

[54] PROCESS FOR THE PRODUCTION OF WATER-SOLUBLE SALTS OF CARBOXYLIC AND AMINO ACIDS

[76] Inventors: Aharon Eyal, Kibbutz Ramat, Rachel, Israel, 90900; Avraham Baniel, 8 Emile Zola Street, Jerusalem 93107, Israel; Larry G. Pillard, 612 N. State St., Monticello, Ill. 61856

[21] Appl. No.: 08/569,135

[22] PCT Filed: Jul. 12, 1994

[86] PCT No.: PCT/US94/07585

§ 371 Date: Jun. 11, 1996

§ 102(e) Date: Jun. 11, 1996

[87] PCT Pub. No.: WO95/02716

PCT Pub. Date: Jan. 26, 1995

[30] Foreign Application Priority Data

Jul. 12, 1993 [IL] Israel ........................................ 106313
Jul. 12, 1993 [IL] Israel ........................................ 106314

[51] Int. Cl.$^6$ .............................. B01D 15/04; C02F 1/42; C12P 13/04; C07C 61/00
[52] U.S. Cl. .......................... 210/638; 562/400; 435/106; 435/136; 435/813; 210/641; 210/651; 210/654; 210/639
[58] Field of Search .................................... 435/106, 108, 435/109, 110, 115, 144, 136, 813; 426/7, 32, 56, 69; 562/580, 400–401; 210/23 H, 638, 651, 641, 650, 653, 654, 500 H, 639; 558/208, 146; 568/492

[56] References Cited

U.S. PATENT DOCUMENTS

| | | | |
|---|---|---|---|
| 3,454,490 | 7/1969 | Wallace | 210/22 |
| 3,642,576 | 2/1972 | Tanaka et al. | 435/110 |
| 3,905,867 | 9/1975 | Kurimura et al. | 435/115 |
| 3,929,575 | 12/1975 | Miescher | 435/110 |
| 4,013,508 | 3/1977 | Zangrandi et al. | 435/109 |
| 4,075,093 | 2/1978 | Walch et al. | 210/23 |
| 4,476,025 | 10/1984 | Chum et al. | 210/638 |
| 4,560,653 | 12/1985 | Sherwin et al. | 435/109 |
| 4,601,829 | 7/1986 | Kaneko et al. | 210/638 |
| 4,601,983 | 7/1986 | Nakamori et al. | 435/115 |
| 4,775,478 | 10/1988 | Voss et al. | 210/638 |
| 4,818,409 | 4/1989 | Puetter et al. | 435/106 |
| 4,861,722 | 8/1989 | Sano et al. | 435/252.32 |
| 5,000,832 | 3/1991 | Steiniger et al. | 204/182 |
| 5,149,643 | 9/1992 | Mothes et al. | 435/144 |

FOREIGN PATENT DOCUMENTS

| | | |
|---|---|---|
| 0 378 081 | 1/1990 | European Pat. Off. . |
| 2 297 659 | 1/1976 | France . |
| 1 503 843 | 1/1976 | United Kingdom . |
| 93/23150 | 5/1993 | WIPO . |

*Primary Examiner*—Lynette R. F. Smith
*Assistant Examiner*—Datquan Lee
*Attorney, Agent, or Firm*—Foley & Lardner

[57] ABSTRACT

The invention provides a process for the production and utilization of water-soluble salts selected from the group consisting of water-soluble salts of carboxylic acids and water-soluble salts of amino acids, comprising reacting an aqueous feed solution containing an amino or carboxylic acid or their anions with a water-soluble base, in indirect contact via a semi-permeable membrane, the membrane being permselective to amino acids, carboxylic acids and their anions over cations and non-ionized species, whereby there is formed a salt solution of the acid containing less impurities per anion than the feed solution and utilizing the salt values from the formed salt solution of the acid.

23 Claims, No Drawings

PROCESS FOR THE PRODUCTION OF WATER-SOLUBLE SALTS OF CARBOXYLIC AND AMINO ACIDS

This application was filed Jun. 11, 1996 as the National Stage of International Application PCT/US94/07585, filed Jul. 12, 1994.

The present invention relates to a process for the production of water-soluble salts.

More particularly, the present invention relates to a process for the production and utilization of water-soluble salts of carboxylic and amino acids.

As is known, both carboxylic acids and amino acids formed on fermentation of carbohydrates are obtained in a fermentation broth containing residual carbohydrates and other impurities. Similar to mineral acids, they are usually purified prior to the neutralization which produces their salts, e.g., trisodium citrate is currently produced from pure citric acid recovered from fermentation broth by a sequence of separation methods, and monosodium glutamate is currently produced from pure glutamic acid recovered from fermentation broth by a sequence of separation methods.

As described, e.g., in *Kirk-Othmer Encyclopedia of Chemical Technology*, Third Ed., Vol. 2, pp. 413–415, excretion of amino acids by microorganisms, when an excess of ammonium salt was added, was reported as early as 1950. In 1956, Kinoshita and co-workers discovered a new strain of *Micrococcus glutamicus* (afterwards renamed as *Corynebacterium gluatamicum*), which accumulates about 30% L-glutamic acid based on the original glucose in its cultivating broth. This discovery led to microbial production of several amino acids by inducing artificial mutants.

As is now known, glutamic acid-producing microorganisms are well-distributed throughout the natural environment. They are classified taxonomically as the Micrococcus, Brevibacterium, Corynebacterium, Arthrobacter and Microbacterium genera. They all have intense glutamate dehydrogenase activity and oxidative degradability, to both L-glutamic acid and α-ketoglutaric acid. The carbon sources for biosynthesis of glutamic acid include acetic acid and the commonly used carbohydrates.

In industry, microorganisms used for glutamic acid fermentation are usually preserved under lyophilization or, for shorter periods, by keeping the stock culture below 10–15° C. To refresh the microorganisms, stocked in either form, they are inoculated on a strip of an agar medium composed of 1% yeast extract and polypeptone, 0.5% sodium chloride and 2% agar, at a temperature optimal for the microorganisms.

The refreshed microorganisms are then cultivated in a liquid medium in a flask and are shaken vigorously; they are then transferred into a small fermentor to let them propagate to about 10 kL for seed culture.

Industrial-scale fermenters are pressure-tight, stainless steel containers, built to hold up to several hundred kiloliters of cultivating medium. They are equipped with aeration and stirring devices, as well as other automatic controls. Fermentation takes from 35 to 45 hours.

In the initial stage of fermentation, only the propagation of microorganisms is observed, but in the middle stage, accumulation of L-glutamic acid starts suddenly. The end of the process is the cessation of the increase of L-glutamic acid.

After sterilization either in the fermenter or by a heat exchanger, the fermented broth is transferred to another vessel; then it is centrifuged to remove microorganism cells and other solid organic matter.

After the cleared liquid has been concentrated under reduced pressure, the pH is adjusted to 3.2, using hydrochloric acid. This precipitates crude L-glutamic acid crystals, the raw material for purified monosodium L-glutamate.

As reported above, purification of amino acids such as glutamic acid prior to their neutralization usually entails dilution of the acid, unless energy is introduced. In several cases, the energy used is chemical energy, leading to consumption of reagents and to formation of by-product salts, which must then be removed.

Purification of carboxylic acids such as citric acid prior to their neutralization usually entails dilution of the acid, unless energy is introduced. In several cases, the energy used is chemical energy, leading to consumption of reagents and to formation of by-product salts, which must then be removed.

U.S. Pat. No. 3,944,606 suggests the formation of sodium citrate by a combination of extraction and neutralization steps. The acid is extracted from an aqueous feed containing the same into an extractant which, after phase separation, is contacted with NaOH solution. Sodium citrate is formed and the extractant is regenerated.

A similar method is known for the production of calcium acetate, a de-icer. Acetic acid is extracted from fermentation broth. The extract is then contacted with lime milk to form the acetate, and the extractant is then recovered for reuse.

Solvent extraction utilizing organic solvents, which require mixing of the phases and their separation, may not be attractive in many cases, particularly in such cases in which the extractant contaminates the product.

The extraction/neutralization process can serve not only as a purification means, but also for concentration of the product. The water content of the product solution may be limited to the water introduced with the base. Such a combination of purification and concentration is attractive, particularly in cases in which the feed acid solution is dilute. However, achievement of purification and concentration through extraction and neutralization has an inherent disadvantage in that extraction from dilute solutions requires large volumes of the extractant, resulting in large volumes in both the extraction and neutralization stages.

Purification and concentration are particularly advantageous if continuous removal of the product acid from the fermentation liquor is achieved, thus providing continuous fermentation. Here again the drawbacks of extraction are obvious: the operation is complicated and large volumes are required. In addition, the extractant, in many cases, has a toxic effect on micro-organisms.

With the above-mentioned state of the art in mind, according to the present invention there is now provided a process for the production and utilization of water-soluble salts selected from the group consisting of water-soluble salts of carboxylic acids and water-soluble salts of amino acids, comprising reacting an aqueous feed solution containing an amino or carboxylic acid or their anions with a water-soluble base, in indirect contact via a semi-permeable membrane, said membrane being permselective to amino acids, carboxylic acids and their anions over cations and non-ionized species, whereby there is formed a salt solution of said acid, containing less impurities per anion than said feed solution and utilizing said salt values from said formed salt solution of said acid.

In a first preferred embodiment of the present invention, there is provided a process for the production and utilization of water-soluble salts of amino acids, comprising reacting an aqueous feed solution containing an amino acid or its anion with a water-soluble base in indirect contact, via a semi-permeable membrane, said membrane being permselective to amino acids and their anions over cations and non-ionized species, whereby there is formed a salt solution of said amino acid, containing less impurities per anion than said feed solution and utilizing said salt values from said formed salt solution of said amino acid.

Preferably, said amino acid is selected from the group consisting of glutamic acid, lysine and aspartic acid.

In a second preferred embodiment of the present invention, there is provided a process for the production and utilization of water-soluble salts of carboxylic acids, comprising reacting an aqueous feed solution containing a carboxylic acid or its anion with a water-soluble base in indirect contact, via a semi-permeable membrane, said membrane being permselective to carboxylic acids and their anions over cations and non-ionized species, whereby there is formed a salt solution of said carboxylic acid, containing less impurities per anion than said feed solution and utilizing said salt values from said formed salt solution of said carboxylic acid.

Preferably, said carboxylic acid is selected from the group consisting of citric, lactic and acetic acids.

The water-soluble bases preferably used in the present invention are selected from alkali, alkaline earth, or ammonium hydroxide or carbonate.

An advantage of the preferred embodiments of the present invention is that the concentration of carboxylic acid anions in said formed salt solution is higher than the concentration of said carboxylic acid anions in said aqueous feed solution.

In preferred embodiments of the present invention, said salt is crystallized and recovered from said salt solution.

As is known, direct contact between an acid and a base is performed by mixing an acid or its aqueous solution with a base or its aqueous solution, while indirect contact between an acid and a base is a reaction between acid (or its solution) and a base (or its solution), separated by a semi-permeable membrane.

Semi-permeable ion-exchange membranes are known and commercially available. Their main use is in the field of water desalination by processes in which ions are caused to migrate across such membranes from a dilute to a concentrated aqueous solution under the influence of an electric field and, to a lesser degree, in a so-called "Donnan dialysis" in which ions are exchanged between two aqueous solutions across an ion-exchange membrane.

In accordance with a preferred embodiment of the present invention, the product acid is withdrawn continuously from a fermentation broth by indirect contact neutralization with a water-soluble base during the course of fermentation. Said fermentation is normally carried out at a pH of at least 3 or higher, and should be maintained at such a pH at which the micro-organisms best function. This mode of operation also affords the additional advantage of preventing product inhibition without at the same time causing any pollution of the fermentation broth.

In accordance with one embodiment of the continuous mode of operation, at least one module consisting of two spaced membranes is fitted within the fermentor vessel and a solution of a base is continuously circulated between the membranes.

In accordance with another embodiment of the continuous mode of operation, fermentation broth is circulated continuously through a suitably-designed membrane module located outside the fermentor vessel and comprising at least one fermentation broth flow path and one base flow path.

If desired, the fermentation broth withdrawn from the fermentation vessel may be filtered before its introduction into the membrane module for the removal of biomass comprising microorganism cells and cell debris, in which case a hollow fiber membrane module may, for example, be used for the indirect contact neutralization. If the whole broth is circulated through the membrane module without preliminary removal of the biomass, a membrane module with wide enough channels between the membranes is necessary, e.g., such as is used in microfiltration processes for the separation of cells from fermentation media.

The ion exchange membranes used for the purpose of the present invention should preferably be in the form of a leak-free convenient module, such as a potted capillary or a hollow fiber membrane tube-and-shell module, a spiral-wound membrane sleeve, or any similar arrangement by which the two circulating streams are totally separate. The surface area per volume of an ion exchange membrane in a module is of the order of several $m^2$ per liter.

From the general kinetics of ion exchange, it is known that ion transport in dilute aqueous solutions, which are the main area of application of the present invention, is film-controlled, i.e., the flow through or into the ion exchanger is faster than the flow through the unstirred solution adjacent to it. The two critical factors are therefore the membrane area and the thickness of the unstirred layer. With depolarizing crossflow and turbulence-promoting spacers available, such unstirred layer can be kept within the range of 10–50 $\mu$m.

In an especially preferred embodiment, the present invention utilizes at least one device, comprising at least two chambers separated by a semi-permeable membrane. The first chamber (hereinafter, "feed chamber") of the device contains an impure aqueous solution of the carboxylic acid to be reacted ("feed solution"), while the second chamber contains the base. The product accumulates in the second chamber (referred to hereinafter as the "product chamber", since the desired salt is formed therein).

The feed solution may be a fermentation liquor, or may contain such liquor. In a preferred embodiment of the present invention, the acid is formed in the feed chamber due to chemical reaction or due to fermentation. For this purpose, even a neutral solution will be considered a feed solution, since without pH control and base addition, the pH in the solution decreases with time, due to the formation of acid therewithin.

U.S. Pat. No. 4,775,478 (Voss and Bruecken) describes acid removal from a solution also containing water, solvent, low molecular weight substances and ions. Said patent refers to a particular case of cathodic electrocoating baths, in which electrically-conductive substrates are coated with cationic resins present in the form of aqueous dispersions. Part or all of the dip-coating bath is subjected to an ultrafiltration in which the ultrafiltration membrane retains the cationic resins and an ultrafiltrate is formed. This ultrafiltrate, or part of it, and an aqueous solution of an organic or inorganic base are each introduced into one or more chambers separated from each other by an anion exchange membrane.

It has now been surprisingly found that a similar process provides not only the removal of an acid, but also the production of water-soluble salts of an amino or carboxylic acid introduced as a contaminated feed solution, or formed in situ in the feed chamber, the product being markedly more pure than the feed solution and being readily recoverable and utilizable for commercial purposes.

In copending Israel Specification 101,905 there is described and claimed a method of producing carboxylic acid by fermentation in an aqueous fermentation broth within a fermentor vessel and recovery of product carboxylic acid from the latter, characterized in that product carboxylic acid is withdrawn from the fermentation broth by indirect contact extraction across an anion-exchange membrane by means of a water-immiscible organic extractant containing at least one long-chain organic amine.

As will be realized, said invention, while involved with withdrawal of an acid from a feed solution by indirect contact across an anion-exchange membrane, is directed and limited to an extraction method utilizing a water-immiscible organic extractant and thus is substantially different in concept and reactants from the process of the present invention.

In copending Israel Specification No. 101,906, there is described and claimed an indirect contact extraction method of the kind in which a solute is extracted from an aqueous feed solution into a receiver solution across a permselective membrane that is permeable to said solute and impermeable to the extraction reagent and its association products, characterized in that an aqueous receiver solution is used for the extraction.

While not limited to the use of a water-immiscible organic extractant, said prior specification is also directed to an extraction method rather than to an indirect contact neutralization reaction between an acid and a water-soluble base for the purpose of forming a desired water-soluble salt of the feed acid.

As is known and as even described in said prior registration, extraction methods utilize as an extraction agent a compound capable of forming an association product with a solute, and thereby are able to extract such a solute from an aqueous feed into a receiver solution wherein the loaded extractant is made to undergo dissociation to liberate the extraction reagent and thereby renders the extractant solution available for further extraction.

In contradistinction thereto, in the salt-forming neutralization reaction of the present invention, both the desired acid salt and water are formed, and, in fact, in the present invention the cation of the reacting base forms a part of the desired final product.

Thus said prior extraction method is also different in concept and in reactants from the process of the present invention, and said prior specification certainly does not teach the use of a water-soluble base such as an alkali, alkaline earth or ammonium hydroxide or carbonate to form an amine salt or a carboxylic acid salt thereof.

The membranes suitable for application in the process of the present invention are permeable to anions, but block the permeation of non-electrolytes and cations. Some of these membranes block protons with the cations, but that is not a requirement of the process. Suitable membranes comprise those described in U.S. Pat. No. 4,775,478, the teachings of which are incorporated herein by reference.

Use of a hydrophilic membrane provides for water transport between the chambers, driven by osmotic pressure. In the case of concentrated product salt solution in the product chamber, water may transfer to this chamber. In order to avoid dilution of the product, pressure is applied in the product chamber by known means (e.g., those used in reverse osmosis).

During the process, the base fed into the product chamber is converted into the salt product. In a batch operation, salt concentration in the product chamber increases with time. In continuous operation, a salt-containing solution, with some base added, may be introduced into the product chamber. Part of the solution obtained from the product chamber is recycled, while another part is further processed for salt recovery, or for other purposes.

Product salt recovery is usually performed through cooling the solution obtained, or through evaporation/crystallization of said solution.

In cases where feed solution contains acid or acid anions and also cations capable of forming water-immiscible carbonates or bi-carbonates, $CO_2$ under pressure may be applied in the feed chamber. Precipitation of the carbonate or bi-carbonates enhances the production of the water-soluble salt.

Solids and biomass present in the feed may be removed prior to introduction into the feed chamber, e.g., by ultrafiltration, to avoid fouling of the membrane. Water-immiscible bases, introduced into the product compartment, are, however, less problematic, as they are converted into water-soluble salts during the indirect reaction. These bases can be fed into the product chamber as a suspension in water.

The process of the present invention is very useful in the production of calcium and magnesium acetate, used as de-icers. Dilute (about 3%) and contaminated acetic acid solution are obtained on fermentation of carbohydrates or cellulosic material. This solution is fed to the feed chamber, while a suspension of lime, limestone or dolomitic lime is fed into the product chamber. Acetic acid transfers through the membranes that block the impurities, and react with the base to form the corresponding acetate. High concentrations of the product salt are obtainable and high efficiency can be achieved in acetic acid conversion to the salt. However, the process is not dependent on complete conversion, as the solution obtained from the feed chamber can also be recycled to fermentation for re-enrichment. Unlike an alternative process based on solvent extraction [Wise and Augenstein, *Solar Energy*, Vol. 41, p. 403, (1988)], the recycled stream is free of solvent and other additives that may be toxic to the micro-organisms.

Similarly, concentrated and purified solution of salts can be produced using other feed solutions containing dilute and contaminated acid. Thus, in production of citric acid by the conventional liming/acidulation process, contaminated and dilute citric acid solutions are obtained. In current practice, such solutions are recycled to the liming, thereby increasing the load at the purification stage and increasing lime and sulfuric acid consumption and increasing product losses. Indirect contact conversion of the citric acid in these solutions to trisodium citrate, decreases these burdens.

A highly attractive embodiment of the present invention is the continuous separation of a formed amino acid from the fermentation broth during fermentation, and converting it to the required soluble salt. The present invention provides efficient conversion of amino acid, even from dilute fermentation broth, combined with purification and concentration. Such continuous conversion to purified, concentrated water-soluble salts is of particular interest in cases where efficient fermentation is limited to high pH values.

Thus, for example, efficient production of glutamic acid by fermentation, using glutamic acid-producing microorganisms, is performed at pH>7–8. Heretofore, the general practice in these cases was to continuously add a base to the fermentor, to neutralize the acid formed and to maintain the optimal pH. The salt formed builds up in the broth up to a level that inhibits further production. The salt obtained is contaminated by carbohydrates and other electrolytic and non-electrolytic contaminants typical to fermentation.

According to the present invention, the base, instead of being added to the fermentation liquor in direct contact neutralization, is utilized in indirect contact via a semi-permeable membrane which separates the fermentation liquor from the base.

Thus, in accordance with an especially preferred embodiment of the present invention, there is now provided a process for the production and utilization of water-soluble salts of amino acids, while concurrently facilitating a continuous fermentation of carbohydrates, comprising reacting a fermentation liquor containing an amino acid or its anion as a fermentation product in a first reaction chamber, with a base in a second reaction chamber, in indirect contact via a semi-permeable membrane separating said chambers, said membrane being permselective to amino acids and their anions over cations and non-ionized species, whereby there is formed a salt solution of said amino acid in said second reaction chamber containing less impurities per anion than said fermentation liquor and utilizing said salt values from said formed salt solution of said amino acid, while concurrently adding additional base to said second reaction chamber to utilize the driving force of neutralization between said acid and said base, thereby drawing additional acid from said first chamber as it forms and thereby maintaining the pH in said first chamber at a level conducive to continuous fermentation.

Similarly, a further highly attractive embodiment of the present invention is the continuous separation of a formed carboxylic acid from the fermentation broth during fermentation, and converting it to the required soluble salt. The present invention provides efficient conversion of carboxylic acid, even from dilute fermentation broth, combined with purification and concentration. Such continuous conversion to purified, concentrated water-soluble salts is of particular interest in cases where efficient fermentation is limited to high pH values.

Thus, for example, efficient production of citric acid by fermentation, using yeast, is performed at pH>3, and fermentation for lactic acid production is performed at pH of about at least 5.0. Heretofore, the general practice in these cases was to continuously add a base to the fermentor, to neutralize the acid formed and to maintain the optimal pH. The salt formed builds up in the broth up to a level that inhibits further production. The salt obtained is contaminated by carbohydrates and other electrolytic and non-electrolytic contaminants typical to fermentation.

Thus, in accordance with an especially preferred embodiment of the present invention, there is now provided a process for the production and utilization of water-soluble salts of carboxylic acids, while concurrently facilitating a continuous fermentation of carbohydrates, comprising reacting a fermentation liquor containing a carboxylic acid or its anion as a fermentation product in a first reaction chamber, with a base in a second reaction chamber, in indirect contact via a semi-permeable membrane separating said chambers, said membrane being permselective to acids and their anions over cations and non-ionized species, whereby there is formed a salt solution of said carboxylic acid in said second reaction chamber containing less impurities per anion than said fermentation liquor and utilizing said salt values from said formed salt solution of said carboxylic acid, while concurrently adding additional base to said second reaction chamber to utilize the driving force of neutralization between said acid and said base, thereby drawing additional acid from said first chamber as it forms and thereby maintaining the pH in said first chamber at a level conducive to continuous fermentation.

Suitable membranes are permeable to amino or carboxylic acid, but block co-transport of impurities, so that a pure and concentrated solution of the corresponding soluble salt is formed in the product chamber, consuming no extra energy or reagents. Alternatively, membranes which block the cations, including the proton, provide transport of the anions of the acid to the product chamber, balanced by counter-transport of hydroxyls or carbonate anions to the fermentation liquor.

While the invention will now be described in connection with certain preferred embodiments in the following example(s) so that aspects thereof may be more fully understood and appreciated, it is not intended to limit the invention to these particular embodiments. On the contrary, it is intended to cover all alternatives, modifications and equivalents as may be included within the scope of the invention as defined by the appended claims. Thus, the following example(s) which include preferred embodiments will serve to illustrate the practice of this invention, it being understood that the particulars shown are by way of example and for purposes of illustrative discussion of preferred embodiments of the present invention only and are presented in the cause of providing what is believed to be the most useful and readily understood description of formulation procedures as well as of the principles and conceptual aspects of the invention.

EXAMPLE 1

In order to demonstrate the efficacy of the process of the present invention, a simulated fermentation feed solution containing amino acid anions was prepared and a salt of said amino acid was recovered. In this experiment, a two-compartment cell was used. A Neosepta ACH-45 anion exchange membrane was introduced between the compartments. The membrane's active area was 5 cm$^2$. The feed compartment contained a 1 M solution of monosodium glutamate with added glucose and dyes to simulated fermentation liquor. The product compartment contained 1 M solution of NaOH. The cell was mechanically shaken. Glutamate flux into the product compartment was about 1 $10^{-5}$ mol/m$^2$sec while Na$^+$ flux to the feed compartment was at least 2 orders of magnitude smaller. Glucose and dye transport into the product compartment was below detection limits. The monosodium glutamate solution obtained in the product compartment was concentrated to precipitate the monosodium glutamate therefrom.

EXAMPLE 2

In order to demonstrate the efficacy of the process of the present invention, a simulated fermentation feed solution containing carboxylic acid was prepared and a salt of said carboxylic acid was recovered. In this experiment, a two-compartment cell was used. A Neosepta ACH-45 anion exchange membrane was introduced between the compartments. The membrane's active area was 5 cm$^2$. The feed compartment contained a 0.5 M solution of monosodium citrate with added glucose and dyes to simulated fermentation liquor. The product compartment contained 1 M solution of NaOH. The cell was mechanically shaken. Citrate flux into the product compartment was about 3 $10^{-5}$ mol/m$^2$sec while Na$^+$ flux to the feed compartment was at least 2 orders of magnitude smaller. Glucose and dye transport into the product compartment was below detection limits. The trisodium citrate solution obtained in the product compartment was concentrated to precipitate the trisodium citrate therefrom.

EXAMPLE 3

An experiment similar to that described in Example 2 was performed with lactic acid in the feed solution. The sodium lactate solution obtained in the product compartment was further processed for the recovery of lactic acid therefrom by addition of sulfuric acid and extraction by tributylphosphate.

It will be evident to those skilled in the art that the invention is not limited to the details of the foregoing illustrative examples and that the present invention may be embodied in other specific forms without departing from the essential attributes thereof, and it is therefore desired that the present embodiments and examples be considered in all respects as illustrative and not restrictive, reference being made to the appended claims, rather than to the foregoing description, and all changes which come within the meaning and range of equivalency of the claims are therefore intended to be embraced therein.

What is claimed is:

1. A non-electrolytic process for the production of a water-soluble salt of a carboxylic acid or a water-soluble salt of an amino acid, comprising:

reacting an aqueous feed solution containing an amino acid or carboxylic acid produced by fermentation, including carboxylate anions of said fermentation-produced acid, with a water-soluble base, in indirect contact via a semi-permeable membrane, using the driving force of neutralization between said acid on a feed side of said membrane and said base on the other side of said membrane and without the influence of any electric field, said membrane being permselective to carboxylate anions of amino acids and carboxylic acids over cations and non-ionized species, whereby there is formed on said other side of said membrane a solution of a salt of said acid containing less impurities than found in said aqueous feed solution; and recovering said salt of said amino acid or carboxylic acid from said formed salt solution.

2. A process according to claim 1, wherein carboxylic acid and amino acid salts are crystallized and recovered from said salt solution.

3. A process according to claim 1, wherein said feed solution is fermentation liquor.

4. A process according to claim 3, wherein said fermentation liquor is at a pH of at least 3.

5. A process according to claim 1, wherein said water-soluble formed salt is an alkali, alkaline earth or ammonium salt.

6. A process according to claim 1 for the production of a water-soluble salt of an amino acid, comprising reacting an aqueous feed solution containing an amino acid, including anions of said fermentation-produced acid, with an inorganic base in indirect contact, via a semi-permeable membrane, said membrane being permselective to anions of amino acids over cations and non-ionized species, whereby there is formed a solution of a salt of said amino acid containing less impurities than found in said aqueous feed solution, and recovering said salt of said amino acid from said formed salt solution.

7. A process according to claim 6, wherein said amino acid has a pKa greater than 2.

8. A process according to claim 6, wherein said amino acid is selected from the group consisting of glutamic acid, aspartic acid and lysine.

9. A process according to claim 6, wherein said salt is monosodium glutamate.

10. A process according to claim 6, wherein the concentration of amino acid and its anions in said formed salt solution is higher than the concentration of amino acid and its anions in said aqueous feed solution.

11. A process for the production of a water-soluble salt of an amino acid, while concurrently facilitating a continuous fermentation of carbohydrates, comprising:

reacting a fermentation liquor containing an amino acid, including anions of said fermentation-produced acid, as a fermentation product in a first reaction chamber, with an inorganic base in a second reaction chamber, in indirect contact via a semi-permeable membrane separating said chambers, said membrane being permselective to anions of amino acids over cations and non-ionized species, whereby there is formed a solution of a salt of said amino acid in said second reaction chamber containing less impurities than found in said fermentation liquor, and recovering said salt of said amino acid from said formed salt solution, while concurrently adding additional base to said second reaction chamber to utilize the force of neutralization between said amino acid in said first chamber and said base in said second chamber, thereby drawing additional amino acid from said first chamber as it forms and thereby maintaining the pH in said first chamber at a level conducive to continuous fermentation.

12. A process according to claim 11, wherein said fermentation liquor in said first chamber is maintained at a pH of at least 3.

13. A process according to claim 11, wherein the concentration of amino acid and its anions in said formed salt solution is higher than the concentration of amino acid and its anions in said fermentation liquor.

14. A process according to claim 1 for the production of a water-soluble salt of a carboxylic acid, comprising:

reacting an aqueous feed solution containing a carboxylic acid, including anions thereof, with an inorganic base in indirect contact, via a semi-permeable membrane, said membrane being permselective to carboxylate anions of carboxylic acids over cations and non-ionized species, whereby there is formed a solution of a salt of said carboxylic acid containing less impurities than found in said feed solution, and recovering said salt of said carboxylic acid from said formed salt solution.

15. A process according to claim 14, wherein the concentration of carboxylic acid and its anions in said formed salt solution is higher than the concentration of carboxylic acid and its anions in said aqueous feed solution.

16. A process according to claim 14, wherein said carboxylic acid has a pKa >2.

17. A process according to claim 14, wherein said acid is selected from the group consisting of citric, lactic, and acetic acid.

18. A process according to claim 14, wherein said salt is sodium citrate.

19. A process according to claim 14, wherein said salt is sodium lactate.

20. A process according to claim 14, wherein said salt is selected from the group consisting of calcium acetate, magnesium acetate and their double salts.

21. A process for the production of a water-soluble salt of a carboxylic acid, while concurrently facilitating a continuous fermentation of carbohydrates, comprising:

reacting a fermentation liquor containing a carboxylic acid, including carboxylate anions thereof, as a fermentation product in a first reaction chamber, with a water-soluble base in a second reaction chamber, in indirect contact via a semipermeable membrane separating said chambers, said membrane being permselective to carboxylate anions of carboxylic acids over cations and non-ionized species, whereby there is formed a solution of a salt of said carboxylic acid in said second reaction chamber containing less impurities than found in said fermentation liquor, and recovering said salt of said carboxylic acid from said formed salt solution, while concurrently adding additional base to said second reaction chamber to utilize the driving force of neutralization between said carboxylic acid and said base, thereby drawing additional carboxylic acid from said first chamber as it forms and thereby maintaining the pH in said first chamber at a level conducive to continuous fermentation.

22. A process according to claim 21, wherein said fermentation liquor in said first chamber is maintained at a pH of at least 3.

23. A process according to claim 21, wherein the concentration of carboxylic acid and its anions in said formed salt solution is higher than the concentration of carboxylic acid and its anions in said fermentation liquor.

\* \* \* \* \*